United States Patent [19]

Ota et al.

[11] 3,831,034

[45] Aug. 20, 1974

[54] APPARATUS FOR TAKING A CONTINUOUS X-RAY PICTURE OF THE DENTAL ARCH

[75] Inventors: Sadayasu Ota; Masato Miyahara, both of Kyoto, Japan

[73] Assignee: Kabushiki Kaisha Morita Seisakusho, Kyoto, Japan

[22] Filed: Nov. 2, 1972

[21] Appl. No.: 303,125

[30] Foreign Application Priority Data
May 29, 1972  Japan.............................. 47-53165

[52] U.S. Cl................................. 250/523, 250/525
[51] Int. Cl. .......................................... G03b 41/16
[58] Field of Search............................. 250/50, 61.5

[56] References Cited
UNITED STATES PATENTS
3,536,913   10/1970   Huchel............................... 250/61.5

Primary Examiner—James W. Lawrence
Assistant Examiner—C. E. Church
Attorney, Agent, or Firm—Christensen, O'Connor, Garrison & Havelka

[57] ABSTRACT

Apparatus for taking a continuous X-ray picture of the dental arch, wherein an X-ray tube and a film holder are carried on an arm at longitudinally spaced apart positions thereof. With the patient's jaws held between the X-ray tube and the film holder, the arm is so turned that the tube and the film holder are moved along an elliptical arc about the jaws thereby taking a clear, continuous X-ray picture of the dental arch.

3 Claims, 3 Drawing Figures

APPARATUS FOR TAKING A CONTINUOUS X-RAY PICTURE OF THE DENTAL ARCH

This invention relates to an apparatus for taking continuous X-ray pictures of the dental arch of a human being.

For dental diagnosis and treatment it is often required to take clear continuous X-ray pictures of the dental arch of a patient. Since the dental arch approximately forms an elliptical arc, in order to take a continuous picture of the dental arch an X-ray tube and a film may be moved relative to the dental arch along an elliptical path. By moving the tube and the film in such a manner it is possible to obtain a very clear continuous X-ray picture of the dental arch. However, it has been quite difficult to move the X-ray tube and the film continuously along an elliptical path. If a first circle is drawn with a certain radius and another circle having a radius different from that of the first circle is drawn at a center displaced from the center of the first circle in such a manner that the arcs of the two circles are continuous, an ellipse will be obtained. Based on this geometrical principle, it is possible to move an X-ray tube with a film along the arc of a first circle to a predetermined point on the arc, where the center of the circle is displaced so that the tube with the film is moved along the arc of a second circle having a different diameter. This arrangement, however, has the disadvantages that the drive mechanism of the tube and the film is complicated since during the course of photographing operation, the center of the circle must be displaced, and that since the center of the circle must be displaced, the movement of the X-ray tube and the film cannot be continuous so that the pictures taken will necessarily become obscure.

Accordingly, the primary object of this invention is to provide an apparatus for taking a continuous X-ray picture of the dental arch of a human being, wherein the X-ray tube and the film are continuously moved substantially alone an elliptical path.

Another object of the invention is to provide for such an apparatus as aforesaid a simple mechanism for effecting movement of the X-ray tube and the film along an elliptical path.

In a preferred embodiment of the invention, there is provided a guide plate on one surface of which there are formed a pair of guide paths perpendicularly crossing each other. The paths are preferably in the form of grooves in each of which a guide member is longitudinally slidable. In order that the two guide members may not collide with each other while they move in their respective guide grooves, the grooves preferably have fifferent depths. A support arm is pivotably connected to the two slidable guide members. An X-ray tube is mounted on one end of the arm while a film holder is provided on the opposite end of the arm. The arm is so driven by a suitable drive as to turn in a plane parallel to the plane of the guide plate. The turning movement of the arm is effected with the guide members sliding in their respective grooves, and in the course of the turning movement the pivotally connected points of the slidable guide members to the arm remain unchanged. This means that each and every point on the arm is moved along an ellipse whose long and short axes coincide with one and the other of the grooves, respectively, so that the X-ray tube and the film holder are moved along the arc of an ellipse.

The patient has his head positioned between the X-ray tube and the film holder in such a manner that he faces the film holder when the arm is positioned parallel with one of the guide grooves. Under the condition, the X-ray tube projects X-ray from behind the patient's head to pass through the patient's dental arch onto a film on the film holder in front of him. At the start, the X-ray tube is positioned behind the patient's head at one lateral side thereof. When the photographing operation is started, the arm is turned and simultaneously with this turning movement the film holder is rotated so as to successively cause unexposed portions of the film to be exposed to the X-ray that has passed through the patient's jaws until the X-ray tube is moved to the position at the opposite side of the patient's head, where the photographing operation is finished.

The turning movement of the arm is continuous, with the guide grooves defining the movement of the arm. No interruption exists in the course of the turning movement and consequently the photographing operation, so that a clear, continuous picture can be obtained. It is the two grooves alone that define the path along which the arm is moved, so that the mechanism for effecting the arm is quite simple.

The invention will be more clearly understood from the following description of a preferred embodiment thereof with reference to the accompanying drawings, wherein.

Figure 1:
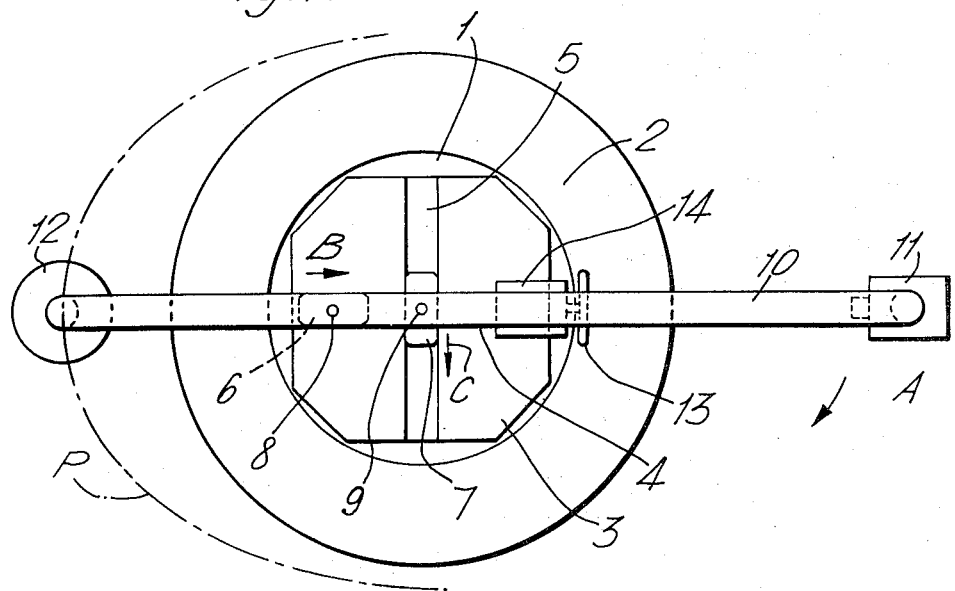
FIG. 1 is a top plan view of a preferred embodiment of the invention.
Figure 2:
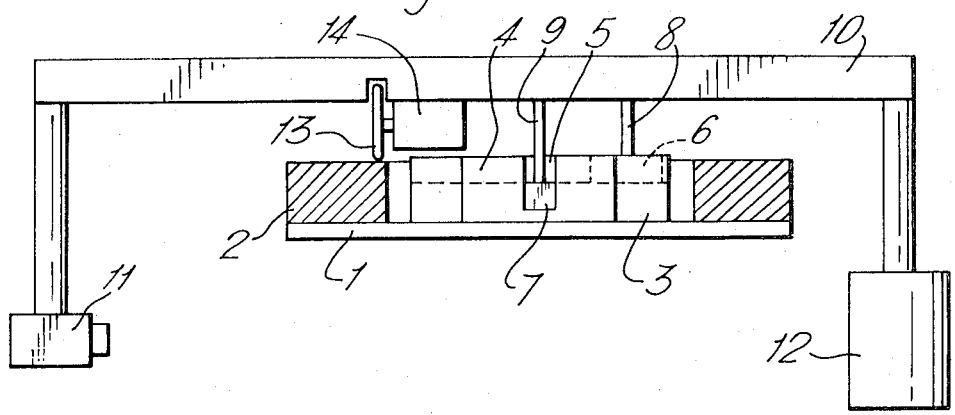
FIG. 2 is a side view, partly in cross-section, of the device shown in FIG. 1.

There is shown a fixed base 1 on which is mounted an annular plate 2. On the upper surface of the base 1 and within the annulus of the annular plate 2 there is provided a guide plate 3, on the upper surface of which there are formed a pair of guide grooves 4 and 5 perpendicularly crossing each other. The groove 5 is deeper than the groove 4. Slidable driven members 6 and 7 are provided in the grooves 4 and 5, respectively, in such a manner that the members can smoothly move longitudinally in their respective grooves, with the under surfaces of the members in sliding contact with the bottom surfaces of the grooves. The slidable member 7 in the deeper groove 5 must be of such a height or thickness that it does not exceed but is lower than the level of the bottom surface of the other groove 4.

The slidable members 6 and 7 are provided on their upper sides with upstanding pivot pins 8 and 9, respectively, by means of which a drive arm 10 is pivotally connected to the members 6 and 7. The arm 10 is provided at one end thereof with an X-ray tube 11 and at the other with a film holder 12 on the outer lateral circumferential surface of which a film is mounted. The arm 10 is further provided with a roller 13 which is driven by a motor 14 fixed to the arm to roll on the upper surface of the annular plate 2.

In operation, as the roller 13 is rotated by the motor 14, the roller 13 rolls on the surface of the annular plate 2. This causes a force to be applied to the arm 10 to turn the same in a plane parallel with the upper surface of the plate 2. This turning movement of the arm is effeced in such a manner alone that the slidable members 6 and 7 move in the grooves 4 and 5. In other words, the connecting point of the arm 10 to the pin 8 is allowed to move only along the length of the groove 4 while the other connecting point of the arm 10 to the pin 9 is allowed to move only along the length of the other groove 5 which extends perpendicularly to the groove 4. Since the distance between the two connecting points remain unchanged, the arm 10 is so turned that any point thereon moves along the arc of an ellipse the long and short axes of which extend parallel with the grooves 4 and 5, respectively.

Figure 3:
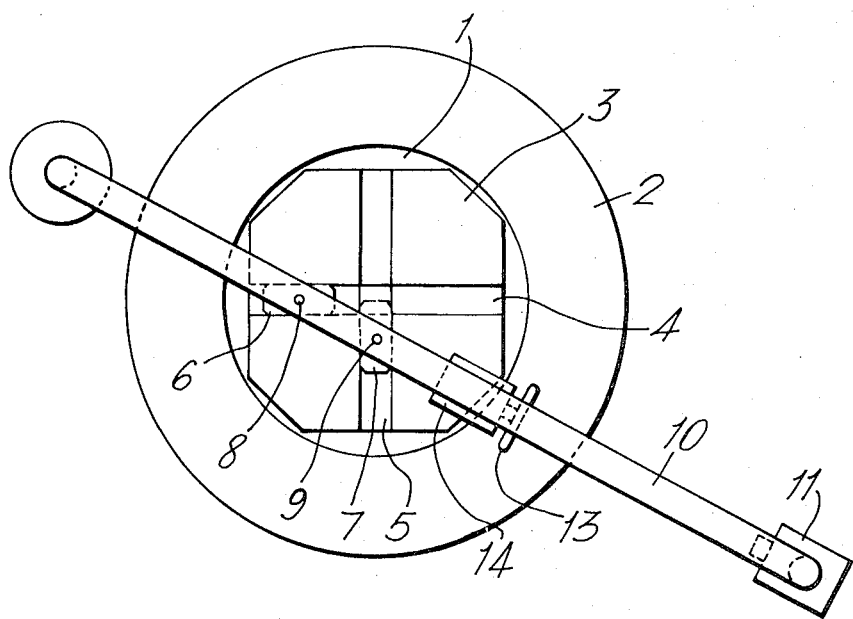
FIG. 3 is a view similar to FIG. 1, with the arm in a different position.

To put it in detail, suppose that in the position shown in FIG. 1, the roller 13 is so rotated by the motor 14 as to turn the arm 10 in the direction of an arrow A. As the arm is so turned, the slidable members 6 and 7 simultaneously move in the directions of arrows B and C, respectively. Suppose that the arm 10 is being turned from the position of FIG. 1 at a constant speed, initially the moving speed of the member 7 is faster than that of the member 6. As the arm is farther turned, the pins 8 and 9 reach a point where they are equidistantly spaced from the crossing point of the two grooves, after which the moving speed of the member 6 becomes faster and that of the member 7 becomes slower, until the arm 10 is presently positioned parallel with the groove 5. FIG. 3 shows the arm 10 in a position in the course of turning.

When the arm 10 is turned from the position shown in FIG. 1 in the direction opposite to the above-mentioned direction A, the slidable members 6 and 7 move in the same manner, with the member 7 moving in the opposite direction.

In this way, as the arm 10 is turned in either direction, the film holder 12 carried by the arm 10 is moved along an elliptical arc P. As can be easily seen, the ellipse has a long axis twice the distance between the holder 12 and the pin 9 and a short axis twice the distance between the holder 12 and the pin 8.

A patient is positioned between the X-ray tube 11 and the film holder 12, with his or her face held motionless adjacent to and toward the film holder 12. In synchronism with the turning movement of the arm 10, the film holder 12 is rotated about its own axis by any known suitable means, not shown, so that unexposed portions of the film on the outer lateral circumferential surface of the holder are successively directed toward the X-ray tube. At the start, the arm 10 is positioned parallel with the groove 5, and from this position the arm is turned to take a continuous picture of the dental arch of the patient on the film.

Unless the distance between the pins 8 and 9 is relatively long or the grooves 4 and 5 are short, the slidable members 6 and 7 would collide with each other about the intersection between the two grooves 4 and 5 as the members slide therealong. To avoid such collision, the two grooves have different depths as previously mentioned, so that the slidable members 6 and 7 move at different levels, that is, the member 7 moves at a lower level than the level of the member 6. This means that each of the members 6 and 7 can pass the intersection of the two grooves without collision against the other member at the intersection.

In the illustrated embodiment, the roller 13 gives a rotational force to the arm 10. For the same purpose any other suitable method may be employed. For example, one or both of the slidable members 6 and 7 may be positively driven to move in the grooves thereby turning the arm 10 in the previously mentioned manner.

What we claim is:

1. In apparatus for recording a continuous X-ray picture of the dental arch, a fixed base, a drive member which is mounted to rotate in a horizontal plane opposite the base, and which is equipped with an X-ray source and an X-ray film holder on opposite sides of the rotational axis thereof, means operable to rotate the drive member, and means responsive to rotation of the drive member to cause the rotational axis of the drive member to shift in relation to the base such that the source and the holder trace coaxial elliptical arcs, including means on the base defining a pair of elongated rectilinear recesses which extend in right-angularly intersecting vertical planes coinciding respectively with the major and minor axes of said arcs, a pair of elongated driven members which are reciprocably engaged in the respective recesses at vertically staggered levels thereof, so that said driven members can pass simultaneously through the intersection of said planes without colliding, and means pivotally interconnecting the driven members with the drive member such that the driven members are caused to reciprocate along the length of their respective recesses in response to rotation of the drive member, including a pin-like interconnection between the drive member and the driven member relatively more remote therefrom, which is adapted and disposed in relation to the driven member relatively more adjacent to the drive member, so as to not collide with the latter driven member when said pin-like interconnection passes through the intersection of said planes.

2. The apparatus according to claim 1 wherein the drive member is disposed above the base and has a motor carried thereon, and there is a wheel driven by the motor, which is interposed between the drive member and the base, and frictionally engaged with a fixed annulus on the base, so as to rotate the drive member in relation to the base as the wheel is driven by the motor.

3. The apparatus according to claim 1 wherein the drive member takes the form of an elongated arm having the source and the holder carried on the ends thereof, and the recesses take the form of grooves of varying depth in the opposing surface of the base.

* * * * *